United States Patent [19]

Matsushima

[11] Patent Number: 5,414,226
[45] Date of Patent: May 9, 1995

[54] TABLET POSITION DIGITIZER

[75] Inventor: Keiichi Matsushima, Yokohama, Japan

[73] Assignee: Graphtec Corp., Yokohama, Japan

[21] Appl. No.: 20,330

[22] Filed: Feb. 19, 1993

[30] Foreign Application Priority Data

Feb. 21, 1992 [JP] Japan ................. 4-072421
Feb. 28, 1992 [JP] Japan ................. 4-078938
Nov. 26, 1992 [JP] Japan ................. 4-337894

[51] Int. Cl.6 ........................... G08C 21/00
[52] U.S. Cl. ........................... 178/18; 178/19; 178/20
[58] Field of Search .................. 178/18, 19, 20

[56] References Cited

U.S. PATENT DOCUMENTS

| | | | |
|---|---|---|---|
| 3,647,963 | 3/1972 | Bailey | 178/19 |
| 3,735,044 | 5/1973 | Centner et al. | 178/18 |
| 4,672,154 | 6/1987 | Rodgers et al. | 178/19 |
| 4,859,814 | 8/1989 | Sciacero et al. | 178/19 |
| 4,878,553 | 11/1989 | Yamanami et al. | 178/18 |
| 4,902,858 | 2/1990 | Yamanami | 178/19 |
| 4,948,926 | 8/1990 | Murakami et al. | 178/19 |
| 4,999,461 | 3/1991 | Murakami | 178/19 |
| 5,023,408 | 6/1991 | Murakami et al. | 178/19 |
| 5,028,745 | 7/1991 | Yamanami et al. | 178/19 |
| 5,070,217 | 12/1991 | Kobayashi et al. | 178/19 |
| 5,120,907 | 6/1992 | Shinbori et al. | 178/19 |
| 5,239,489 | 8/1993 | Russell | 178/19 |

*Primary Examiner*—Stephen Chin
*Assistant Examiner*—Vijay Shankar
*Attorney, Agent, or Firm*—Blakely, Sokoloff, Taylor & Zafman

[57] ABSTRACT

In this digitizer, when the coil of the position indicator is placed near a plurality of conductors of the tablet, an oscillator arrangement is formed through the amplifier, and a position indicated by the position indicator is determined by detecting magnetic fields generated by the position indicator when the oscillator arrangement oscillates. In addition, when the position indicator is placed near the tablet, an oscillator arrangement is constituted by the position indicator and two conductors of the tablet at a timing at which the position of the position indicator is measured.

14 Claims, 11 Drawing Sheets

TABLET POSITION DIGITIZER

BACKGROUND OF THE INVENTION

The present invention relates to a digitizer constituted by a tablet and a position indicator and designed to detect a position indicated by a position indicator placed on the tablet.

In conventional digitizers, especially a cordless digitizer in which the tablet and the position indicator are not connected by wire lines, an oscillator, a first loop coil group, constituted by a plurality of loop coils insulated from each other, and a second loop coil group which is perpendicular to the first loop coil group, are arranged on the tablet side, and a coil is arranged on the position indicator side.

A position or the like indicated by the position indicator placed on the tablet is detected as follows. Frequencies corresponding to the respective resonance frequencies (to be described later) of the position indicator are selected. Drive currents of the selected frequencies are sequentially supplied from the oscillator to the first loop coil group to sequentially generate magnetic fields from the first loop coil group, thus causing electromagnetic coupling between the first loop coil group and the coil of the position indicator. The indicated position is then detected on the basis of the values of induced voltages generated in the second loop coil group by this electromagnetic coupling.

More specifically, the position indicator includes a plurality of capacitors and switches in addition to the above-mentioned coil. One of the capacitors is connected in parallel with the coil to constitute a resonance circuit, while a plurality of parallel pairs of the switches and the capacitors are connected in series with the coil of the resonance circuit. In the position indicator, therefore, when the respective switches are depressed, resonance circuits having different resonance frequencies are formed. On the tablet side, the respective resonance frequencies of the position indicator are detected to check which switch is depressed. That is, in the tablet, frequencies corresponding to the respective resonance frequencies are selected, and drive currents of the selected frequencies are sequentially supplied from the oscillator to the first loop coil group, thus detecting the values of induced voltages generated in the second loop coil group. Whether any one of the switches is depressed or which switch is depressed is checked on the basis of the frequency of a drive current supplied when a predetermined induced voltage value is detected. If a predetermined voltage value is not detected, a detecting operation of sequentially selecting frequencies corresponding to the respective resonance frequencies and supplying drive currents of the selected frequencies to the first loop coil group is repeatedly performed until the predetermined induced voltage value is detected.

When switch depression information associated with the position indicator is to be detected on the tablet side, a drive current of a reference frequency is applied from the tablet to the first loop coil group. The switch depression information can be detected on the basis of the difference between the phase of the drive voltage and that of an inducted voltage generated in the second loop coil group.

In addition, the above-described position indicator may be formed into a pen-like shape so that various input operations can be performed by using the position indicator like a pen.

In this case, the capacitor connected in parallel with the coil of the position indicator is of a variable capacitance type. This variable capacitor changes its capacitance in accordance with the pressing force (writing pressure) of the pen-like position indicator with respect to the tablet.

A digitizer of this type, therefore, detects not only an indicated position but also the writing pressure of the pen-like position indicator with respect to the tablet.

In some digitizers, the above-described oscillator is arranged on the position indicator side. In this arrangement, the coil of the position indicator is oscillated at a predetermined frequency by the oscillator, and magnetic fields generated by this oscillation of the coil are detected as induced voltages generated in the first and second loop coils, thereby detecting a position indicated by the position indicator on the basis of the values of these induced voltages.

As described above, the conventional digitizers use electromagnetic coupling between the tablet and the position indicator. Therefore, either in the scheme of generating magnetic fields from the tablet side or in the scheme of generating magnetic fields from the position indicator side, the apparatus includes an oscillator for always generating magnetic fields. Accordingly, the apparatus is complicated, and hence cannot have a compact, economic arrangement.

Furthermore, when depression information of any one of the switches of the position indicator is to be detected, the respective resonance frequencies of the position indicator are selected, and drive currents of the selected frequencies are supplied to the first loop coil group until a predetermined induced voltage corresponding to the switch depression information is obtained. Therefore, detection of this information requires a long period of time.

When switch depression information is detected on the basis of the difference between the phase of a drive voltage of a reference frequency which is applied to the first loop coil group and the phase of an induced voltage generated in the second loop coil group, only frequencies in a frequency range near the reference frequency can be used. If, therefore, a large number of switches are arranged in the position indicator, a depressed switch cannot be identified, resulting in a decrease in resolution in switch detection.

Moreover, in the apparatus which uses the variable capacitor for the coil of the position indicator to have a writing pressure detecting function as an additional function, high-speed, high-resolution detection of writing pressure information is difficult to achieve for the same reasons as those described with reference to the detection of switch depression information.

SUMMARY OF THE INVENTION

It is, therefore, a principal object of the present invention to provide a digitizer which allows a compact, economic arrangement.

It is another object of the present invention to provide a digitizer which can detect position information associated with a position indicator within a period of time shorter than that required in the conventional digitizers.

It is still another object of the present invention to provide a digitizer which is capable of detection of additional information such as switch depression information or writing pressure information at a speed and resolution higher than those in conventional digitizers.

In order to achieve the above objects, according to an aspect of the present invention, there is provided a digitizer constituted by a tablet and a position indicator and designed to determine coordinates indicated by the position indicator on the tablet, comprising coordinate determining conductor groups arranged on the tablet, a first oscillation element arranged on the tablet, a second oscillation element coupled to the first oscillation element, and a third oscillation element arranged on the position indicator, wherein when the position indicator is placed at an arbitrary position on the tablet, the first, second, and third oscillation elements constitute an oscillator arrangement, and the coordinates indicated by the position indicator are determined by causing magnetic fields or electric fields, generated by the position indicator when the oscillator arrangement oscillates, to act on the coordinate determining conductor groups.

DESCRIPTION OF THE PREFERRED EMBODIMENT

The present invention will be described below with reference to the accompanying drawings.

Figure 1:
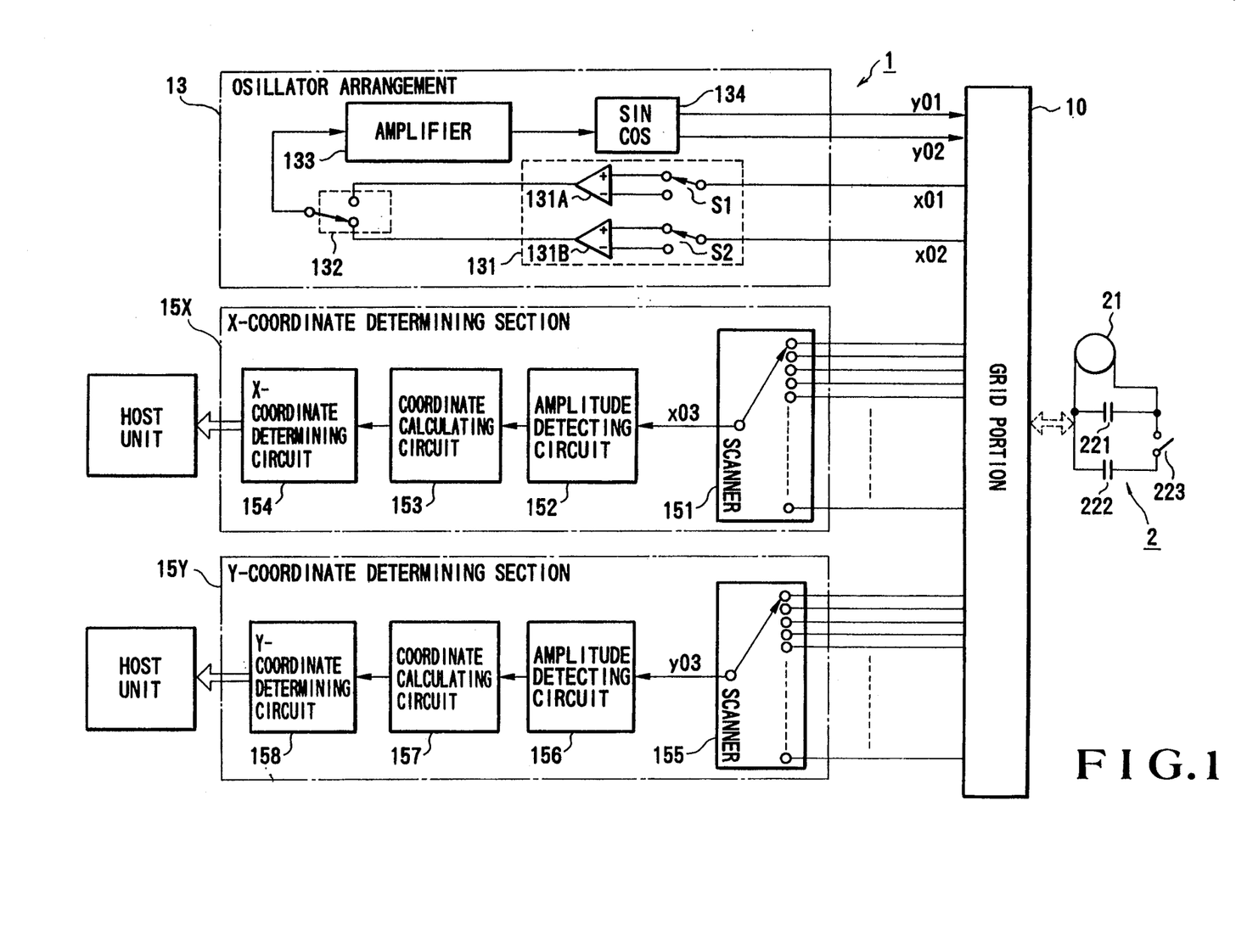
FIG. 1 is a block diagram of a digitizer according to an embodiment of the present invention.

FIG. 1 shows a digitizer according to an embodiment of the present invention. Referring to FIG. 1, the digitizer is constituted by a tablet 1 and a position indicator 2. The tablet 1 comprises a grid portion 10, an oscillator arrangement 13 which incorporates first and second oscillation elements and which does not oscillate normally but oscillates when it is coupled to a third oscillation element, an X-coordinate determining section 15X for determining the X-coordinate indicated by the position indicator 2, and a Y-coordinate determining section 15Y for determining the Y-coordinate indicated by the position indicator 2.

The position indicator 2 is constituted by a coil 21 serving as the third oscillation element for the oscillator arrangement 13, capacitors 221 and 222, and a switch 223. The load of the third oscillation element can be variably changed by an ON/OFF-operation of the switch 223.

Figure 2:
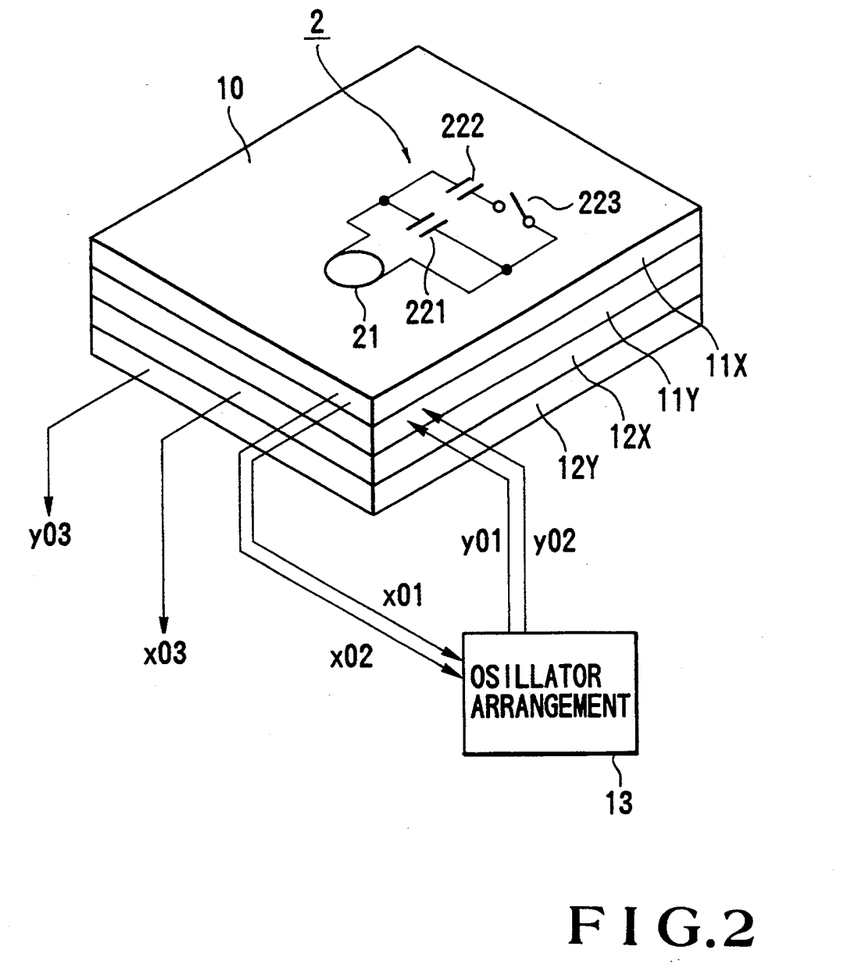
FIG. 2 is a perspective view showing the arrangement of the digitizer in FIG. 1.
Figure 3:
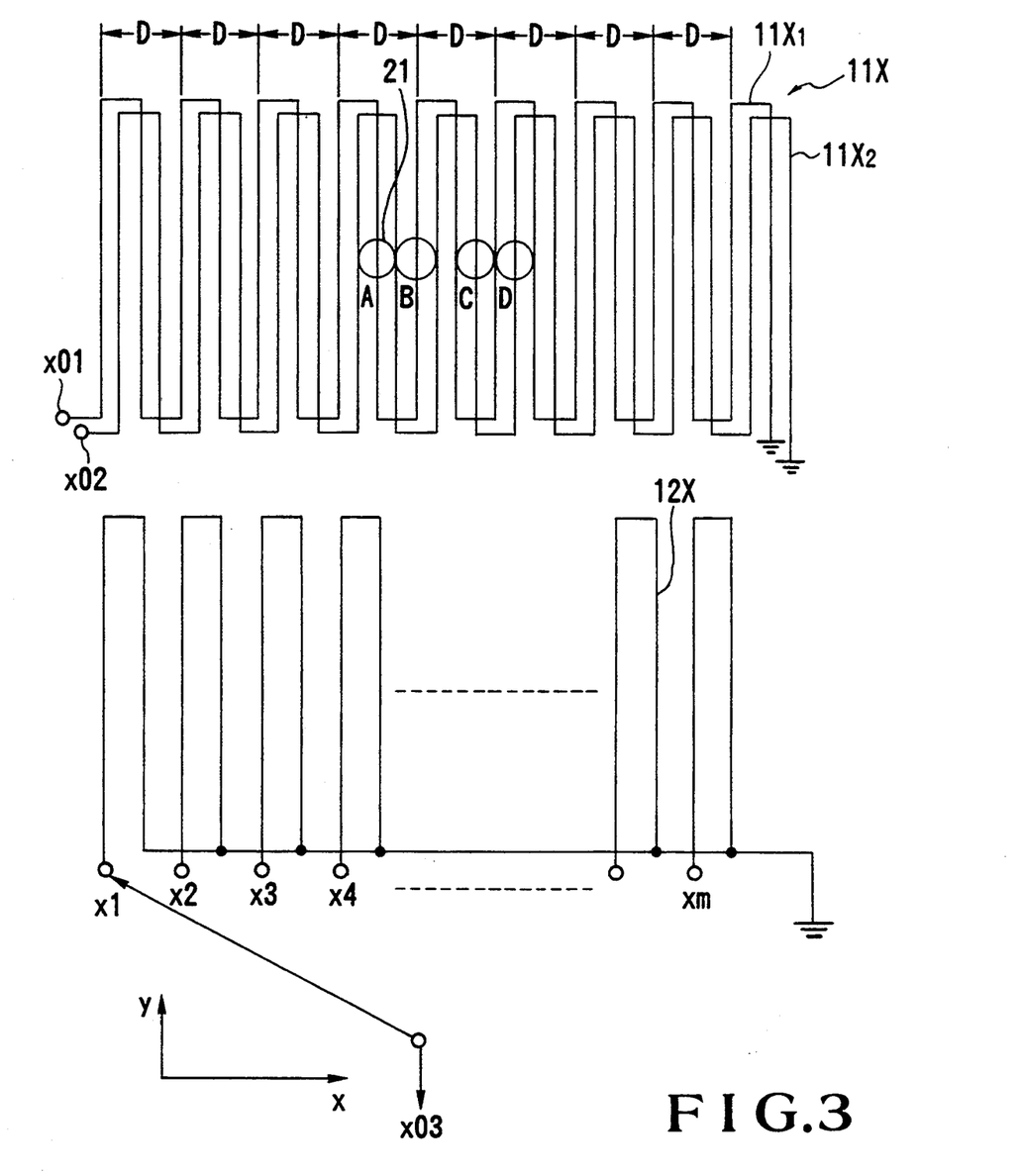
FIG. 3 is a view showing the patterns of a two-phase grid 11X and a loop coil group 12X constituting the digitizer.
Figure 4:
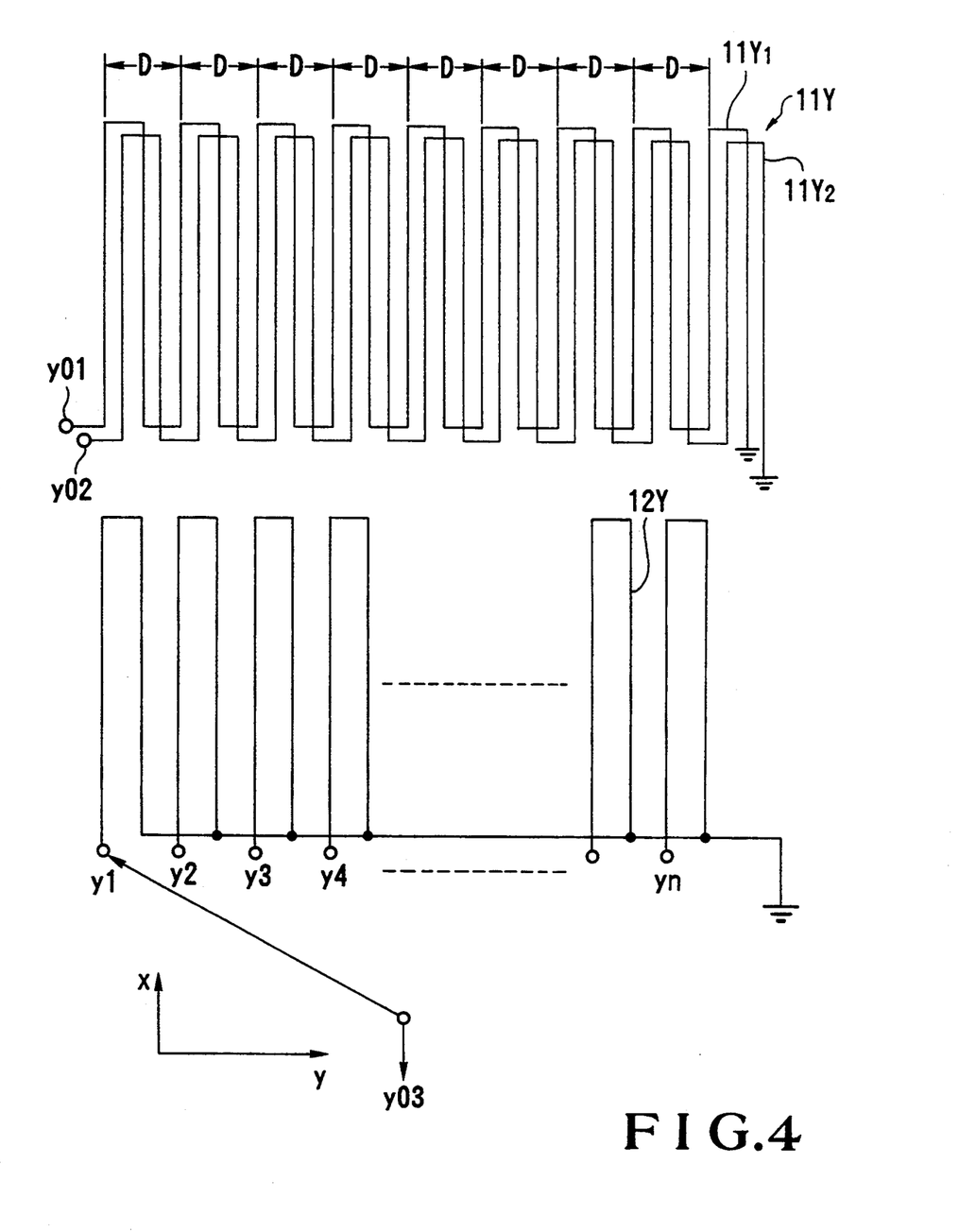
FIG. 4 is a view showing the patterns of a two-phase grid 11Y and a loop coil group 12Y constituting the digitizer.
Figure 5A:
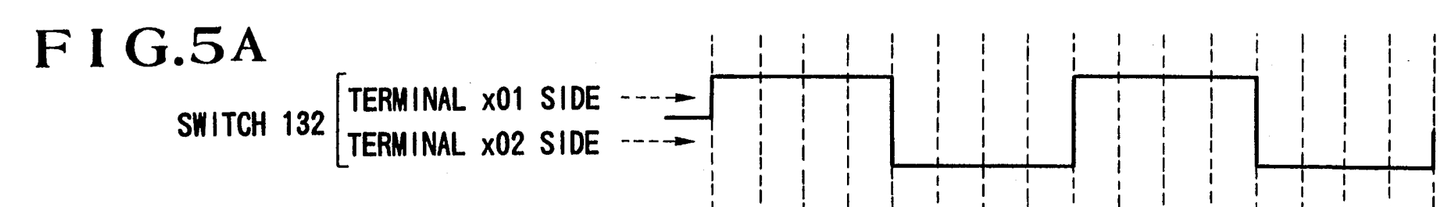
FIGS. 5(a) to 5(d) are timing charts for explaining the state of oscillation.
Figure 5B:
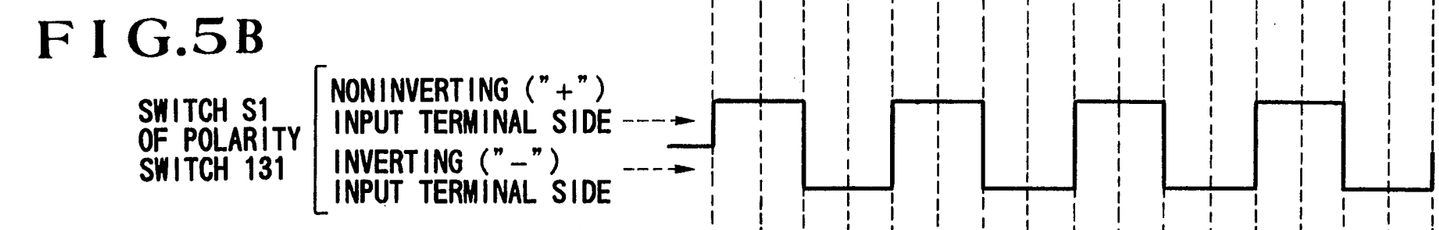
Figures 5C, 5D:
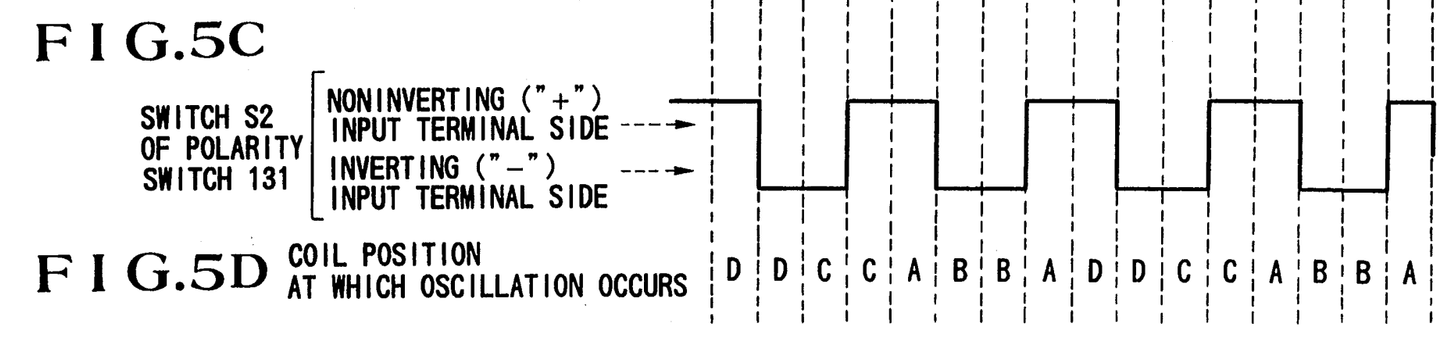
Figure 6:
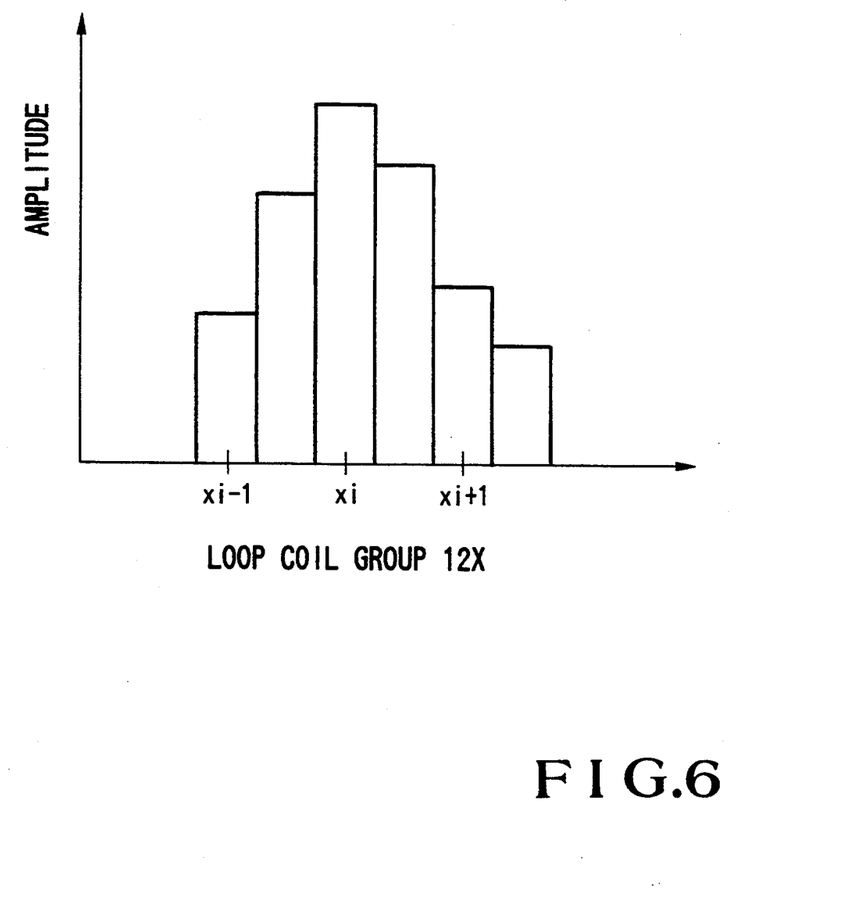
FIG. 6 is a graph showing a state in which a position indicated by a position indicator constituting the digitizer is detected.

In this case, the grid portion 10 of the tablet 1 includes a two-phase grid 11X constituted by two zigzag grid elements extending in the X direction, and a loop coil group 12X constituted by a plurality of loop coils x1 to xm sequentially arranged in the X direction in the form of a comb, as shown in FIG. 3. The grid portion 10 also includes a two-phase grid 11Y constituted by two zigzag grid elements extending in the Y direction, and a loop coil group 12Y constituted by a plurality of loop coils y1 to ym sequentially arranged in the Y direction in the form of a comb, as shown in FIG. 4. Note that the two-phase grids 11X and 11Y shown in FIGS. 3 and 4 are respectively formed on proper substrates (not shown), and the substrates are stacked on each other, as shown in FIG. 2.

The two-phase grids 11X and 11Y are arranged as the first oscillation element constituting the oscillator arrangement of the digitizer, and the loop coil groups 12X and 12Y are arranged as coordinate determining conductor groups.

As shown in FIG. 1, the oscillator arrangement 13 comprises a polarity switch 131, a switch 132 connected to the output stage of the polarity switch 131, an amplifier 133 as the second oscillation element connected to the output stage of the switch 132, and a phase shifter 134 connected to the output stage of the amplifier 133. The input sides of the polarity switch 131 are respectively connected to terminals x01 and x02 of the two-phase grid 11X. The output terminals of the phase shifter 134 are respectively connected to terminals y01 and y02 of the two-phase grid 11Y. That is, sin (sine wave) output and cos (cosine wave) output from the phase shifter 134 are respectively supplied to the terminals y01 and y02 of the two-phase grid 11Y, while switches S1 and S2 of the polarity switch 131 are respectively connected to one terminal x01 and the other terminal x02 of the two-phase grid 11X. An output from the polarity switch 131 is supplied to the phase shifter 134 through the switch 132 and the amplifier 133.

In this arrangement, when the coil 21 of the position indicator 2 is placed on the tablet 1, an oscillation path is constituted by the two-phase grid 11Y (one conductor of the first oscillation element), the position indicator 2 (the third oscillation element), the two-phase grid 11X (the other conductor of the first oscillation element), and the amplifier (the second oscillation element) of the oscillator arrangement 13. If the coil 21 (the third oscillation element) of the position indicator 2, the two-phase grids 11X and 11y (the first oscillation element) of the grid portion 10, or the like is excited by ambient noise, noise produced by a switch, or the like, oscillation is caused by the amplifying effect of the amplifier 133. As a result, a stable magnetic field is generated by the coil 21 of the position indicator 2. Note that the frequency of the magnetic field generated at this time is the eigenvalue of the oscillator arrangement 13 constituted by these elements.

The relationship between the position of the coil 21 as the third oscillation element of the position indicator 2 and oscillation will be described next with reference to FIGS. 1 and 3, provided that the coil 21 is placed on the two-phase grid 11X of the first oscillation element.

Assume that the center of the coil 21 of the position indicator 2 is located at a position A in the two-phase grid 11X shown in FIG. 3, i.e., a position inside a grid element $11X_2$ connected to the terminal x02. In this case, oscillation can be caused by connecting the switch S2 in the polarity switch 131, connected to the terminal x02 of the grid element $11X_2$, to the noninverting ("+") input terminal of an amplifier 131B of gain 1, and connecting the switch 132 to the amplifier 131B.

When the coil 21 is at a position B in the two-phase grid 11X, the coil 21 is located outside the grid element $11X_2$ connected to the terminal x02, contrary to the above-described state. No oscillation is caused in the above-described condition. For this reason, the switch S2 in the polarity switch 131 is connected to the inverting ("−") input terminal of the amplifier 131B to invert the polarity of the current flowing in the grid element $11X_2$, thus causing oscillation.

In addition, assume that the center of the coil 21 is at a position C in the two-phase grid 11X, i.e., a position inside a grid element $11X_1$ connected to the terminal x01. In this case, the switch S1 connected to the terminal x01 of the grid element $11X_1$ is connected to the inverting ("−") input terminal of an amplifier 131A of gain 1, and the switch 132 is connected to the amplifier 131A, thus causing oscillation.

Furthermore, when the coil 21 is at a position D in the two-phase grid 11X, oscillation is caused by connecting the switch S1, connected to the terminal x01 of the grid element $11X_1$, to the noninverting ("+") input terminal of the amplifier 131A.

FIGS. 5(a) to 5(d) show the relationship between the positions A to D of the coil 21 of the position indicator 2 and switching operations of the respective switches in the oscillator arrangement 13. That is, when a control circuit (not shown) executes switching control of the respective switches shown in FIGS. 5(a) to 5(d) at predetermined timings, oscillation can be caused at any of the timings regardless of the existing position of the position indicator 2.

In the apparatus of this embodiment, the grid elements $11X_1$ and $11X_2$ are arranged in order to cause oscillation without fail regardless of the position of the coil 21 of the position indicator 2 on the tablet 1. Assume, for example, that only the grid element $11X_1$ is arranged. In this case, if the center of the coil 21 of the position indicator 2 is located on any portion of the conductor line of the grid element $11X_1$, the resultant output voltage (induced voltage) becomes 0. In contrast to this, according to a two-phase grid structure as in this embodiment, even if the induced voltage in one grid element $11X_1$ is 0, since the induced voltage in the other grid element $11X_2$ is increased, stable oscillation can be achieved.

In this manner, the path constituted by the two-phase grid 11Y (one conductor of the first oscillation element), the position indicator 2 (the third oscillation element), the two-phase grid 11X (the other conductor of the first oscillation element), and the amplifier 133 (the second oscillation element) of the oscillator arrangement 13 is caused to continuously oscillate by switching control of the respective switches in the oscillator arrangement 13.

FIG. 2 illustrates the arrangement of the digitizer described above. The grid portion 10 is formed by sequentially stacking the two-phase grid 11X, the two-phase grid 11Y, the loop coil group 12X, and the loop coil group 12Y in this order with respect to the surface on which the position indicator 2 is placed.

When the position indicator 2 is placed on the surface of the grid portion 10, the path constituted by the two-phase grid 11Y, the position indicator 2, the two-phase grid 11X, and the amplifier 133 of the oscillator arrangement 13 is caused to continuously oscillate, as described above. A magnetic field is then generated by the coil 21 of the position indicator 2 by this oscillation.

Owing to the effect of the generated magnetic field, voltages are respectively induced in the loop coil groups 12X and 12Y. The values of the induced voltages are respectively arithmetically processed by an X-coordinate determining section 15X and a Y-coordinate determining section 15Y to determine the (X,Y) position of the position indicator 2. This position data is then supplied to a host unit.

The loop coil group 12X for determining a position indicated by the position indicator 2 is constituted by the loop coils x1, x2, x3,..., xm sequentially arranged in the X direction, as indicated in a lower portion of FIG. 3, and the loop coil group 12Y is constituted by the loop coils y1, y2, y3,..., yn sequentially arranged in the Y direction, as indicated in a lower portion of FIG. 4.

The terminals of the loop coils of the loop coil groups 12X and 12Y are respectively connected to scanners 151 and 155 in the X-coordinate and Y-coordinate determining sections 15X and 15Y shown in FIG. 1. When, for example, induced voltages in the loop coil group 12X are detected by a scanning operation of the scanner 151, an amplitude detecting circuit 152 obtains the amplitude values of the induced voltages in units of loop coils, and a coordinate calculating circuit 153 calculates a maximum amplitude position from the obtained amplitude values. An X-position determining circuit 154 calculates an X-coordinate value from this calculation result.

Note that since a Y-coordinate value is obtained by the Y-coordinate determining section 15Y in the same manner as described above, and these determining and calculating operations for X-coordinate and Y-coordinate values can be simultaneously performed, the coordinate position of the position indicator 2 can be determined at a very high speed.

As described above, the apparatus of the embodiment includes the two-phase grids 11X and 11Y and the oscillator arrangement 13, which together with the position indicator 2 constitute a specific oscillator arrangement. Therefore, no special oscillator is required. In addition, a position indicated by the position indicator 2 is obtained from induced voltage values generated in the coordinate determining conductors.

The third oscillation element of the position indicator 2 according to the first embodiment includes the coil 21, the capacitors 221 and 222, and the switch 223. When the switch 223 is turned off, a resonance circuit is constituted by the coil 21 and the capacitor 221. When the switch 223 is turned on, a resonance circuit is constituted by the coil 21 and the capacitors 221 and 222.

As described above, in the first embodiment, different oscillator arrangements can be formed by operating the switch 223 of the position indicator 2, thus realizing a structure which can selectively cause oscillation at different frequencies.

Therefore, by measuring the frequencies of signals in any one of the systems shown in FIG. 1, i.e., the oscillator arrangement 13, the X-coordinate determining section 15X, and the Y-coordinate determining section 15Y, the ON/OFF operation of the switch 223 in the position indicator 2 can be identified.

The position indicator 2 shown in FIG. 1 forms two different resonance circuits so as to form two difference oscillator arrangements. If, however, the number of pairs of switches and capacitors is increased, three oscillator arrangements or more can be formed in accordance with the operation of the position indicator, and three operations or more can be identified.

The second and third embodiments of the present invention will be described next. In each of these embodiments, the first oscillation element constituting an oscillator arrangement also serves as a coordinate determining conductor for detecting a position indicated by a position indicator 2.

FIGS. 7(a) to 11 show a digitizer according to the second embodiment of the present invention. The arrangement and operation of the apparatus of the second embodiment will be described below with reference to FIGS. 7(a) to 11.

Figure 7B:
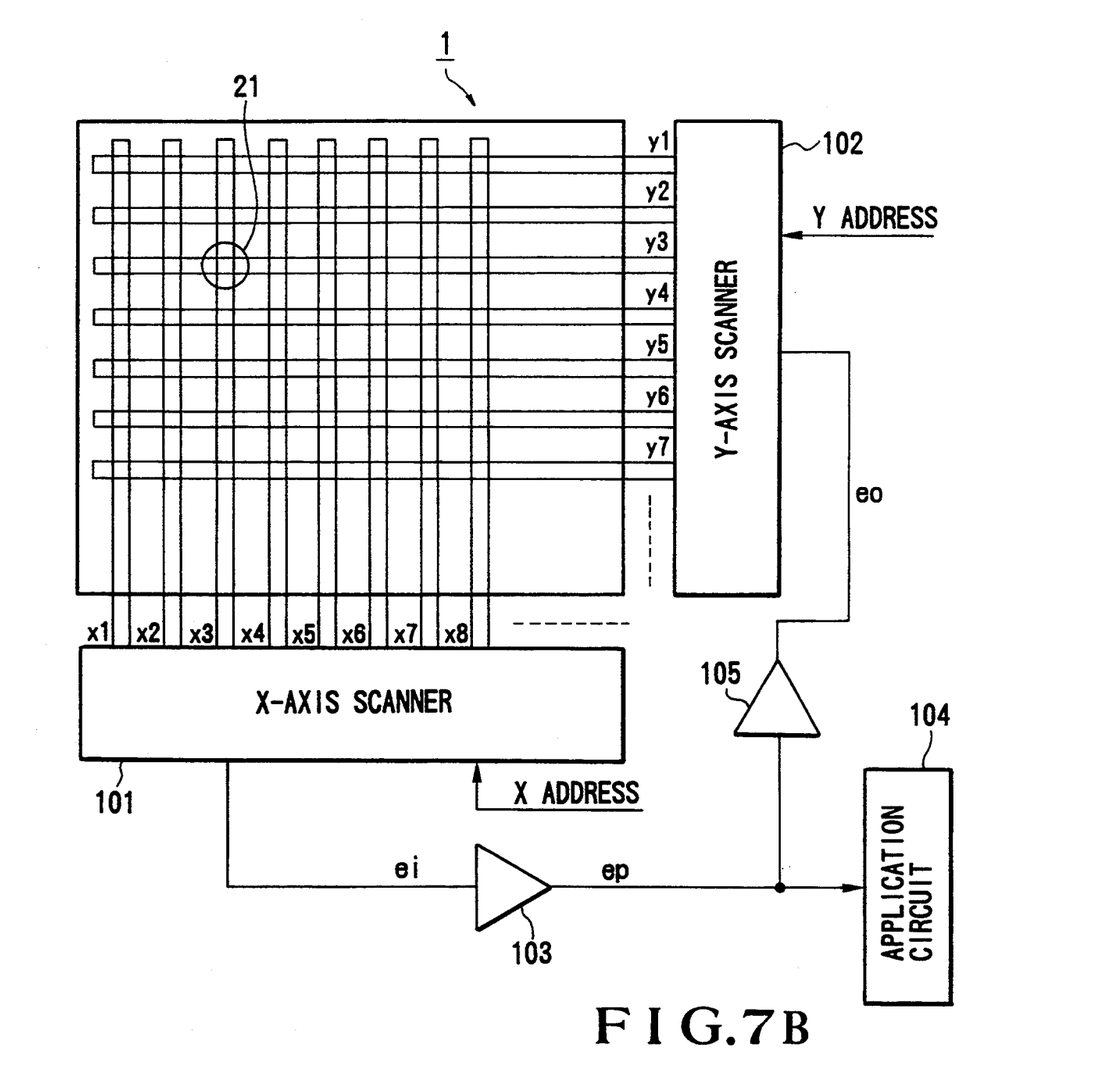
Figure 8:
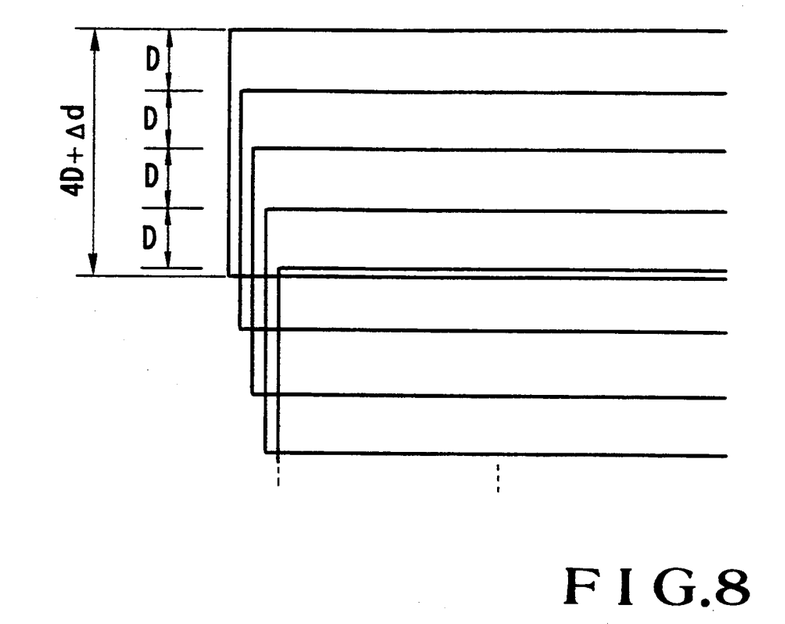
FIG. 8 is a view showing the detailed arrangement of a loop coil group in the apparatus of the second embodiment.
Figure 9A:
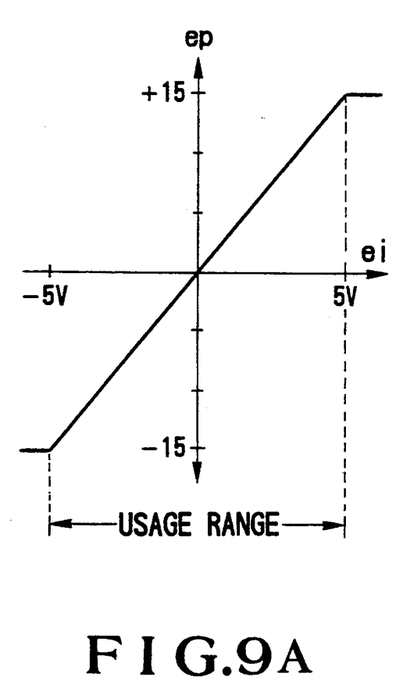
FIGS. 9(a) and 9(b) are graphs respectively showing the characteristics of amplifiers used in the second embodiment.
Figure 9B:
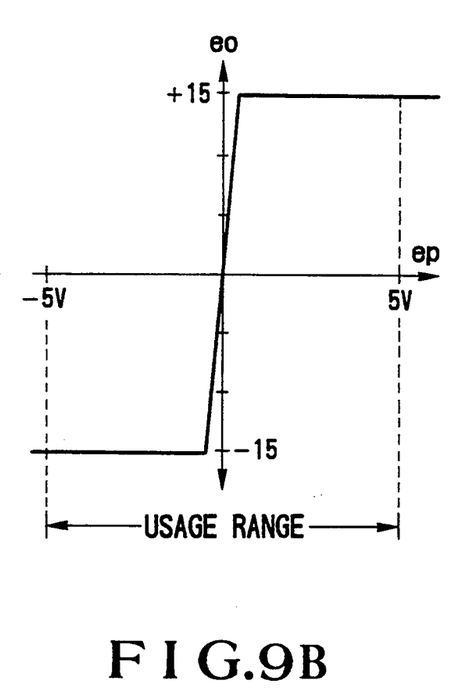

In a tablet 1, the loop coils (x1, x2, x3,...) of an X-axis loop coil group are sequentially arranged in association with respective positions in the X direction, and the loop coils (y1, y2, y3,...) of a Y-axis loop coil group are sequentially arranged in association with respective positions in the Y direction. The X-axis loop coil group is connected to an X-axis scanner 101, and the Y-axis loop coil group is connected to a Y-axis scanner 102. Although these loop coil groups are simplified in FIG. 7(b), for the sake of illustrative convenience, FIG. 8 shows an actual structure in which the loop coils of each group are sequentially arranged in a corresponding direction while they are shifted from each other by a distance D.

The X-axis scanner 101 selects one of the X-axis loop coils at each measurement timing based on an X address signal from a control circuit (not shown) and connects the selected loop coil to the input terminal of a voltage amplifier 103. The Y-axis scanner 102 selects one of the Y-axis loop coils in response to a Y address signal and connects the selected loop coil to the output terminal of a current amplifier 105.

In this case, the X-axis and Y-axis loop coil groups constitute the first oscillation element, and the voltage amplifier 103 and the current amplifier 105 constitute the second oscillation element, respectively, of the oscillator arrangement. The voltage amplifier 103 has the characteristics shown in FIG. 9(a), and obtains an output ep proportional to an input ei within the usage range (input ei = ±5 V or less). The current amplifier 105 has the characteristics shown in FIG. 9(b), and instantaneously outputs a saturation voltage eo in response to the input ep. By arranging the current amplifier 105 in this manner, the oscillator arrangement constituted by these elements can be quickly set in a stable state of oscillation after it starts to oscillate. In the description of the second embodiment, these amplifiers 103 and 105 will be referred to as amplification means hereinafter.

In this arrangement, if the position indicator 2 as the third oscillation element is placed on each selected loop coil, an oscillator arrangement is formed by the following path: the output of the amplification means (the second oscillation element)→the selected Y-axis loop coil (one conductor of the first oscillation element)→the coil 21 of the position indicator 2 (the third oscillation element)→the selected X-axis loop coil (the other conductor of the first oscillation element)→the input of the amplification means (the second oscillation element). As a result, a signal representing a position indicated by the position indicator 2 is output on the basis of an output voltage from the voltage amplifier 103 of the amplification means as the second oscillation element. This output signal is supplied to an application circuit 104 and is used as data for determining the position of the position indicator 2 or identifying a depressed switch.

Figure 7A:
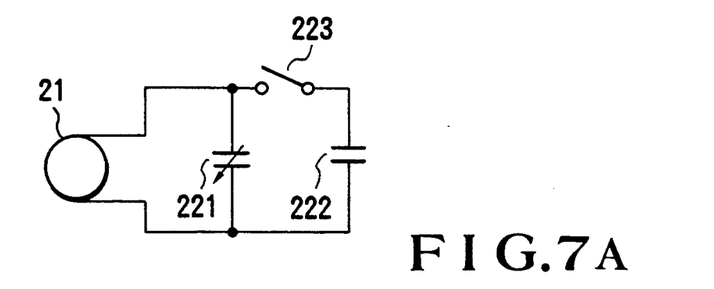
FIGS. 7(a) and 7(b) are block diagrams showing the second embodiment of the present invention.

Note that the arrangement of the third oscillation element of the position indicator 2 shown in FIG. 7(a) is substantially the same as that in the first embodiment described above. In this case, a capacitor 221 is a variable capacitor whose capacitance is variably changed in accordance with, e.g., the contact pressure of the position indicator 2 with respect to the tablet 1. In addition, a capacitor 222 is connected in parallel with the capacitor 221 and a coil 21 through a switch 223 and is used to identify the ON/OFF operation of the switch 223.

Figure 10A:
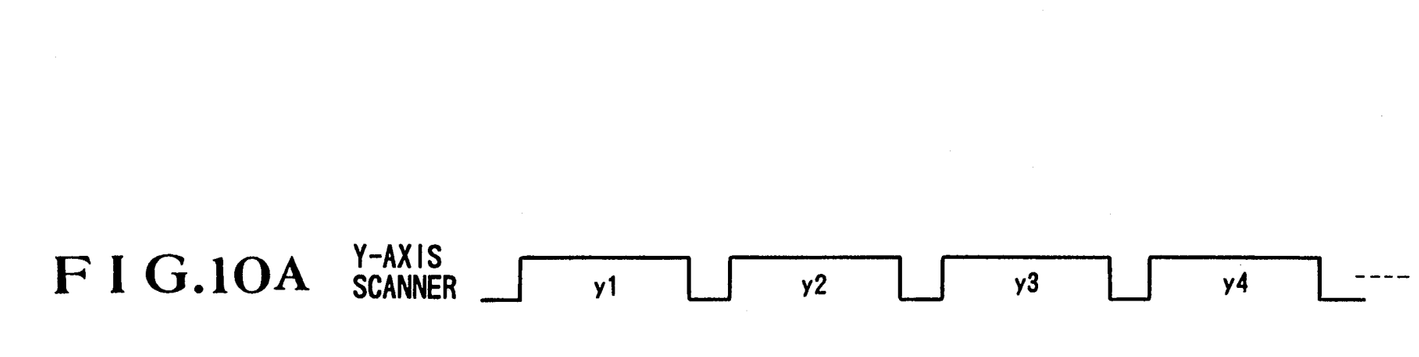
FIGS. 10(a) and 10(b) are timing charts showing the timing at which a position indicated by a position indicator is measured by the apparatus of the second embodiment.

In the apparatus of the second embodiment, as shown in FIG. 10(a), the Y-axis scanner 102 sequentially connects the respective Y-axis loop coils to the output side of the amplification means at predetermined timings.

Figure 10B:
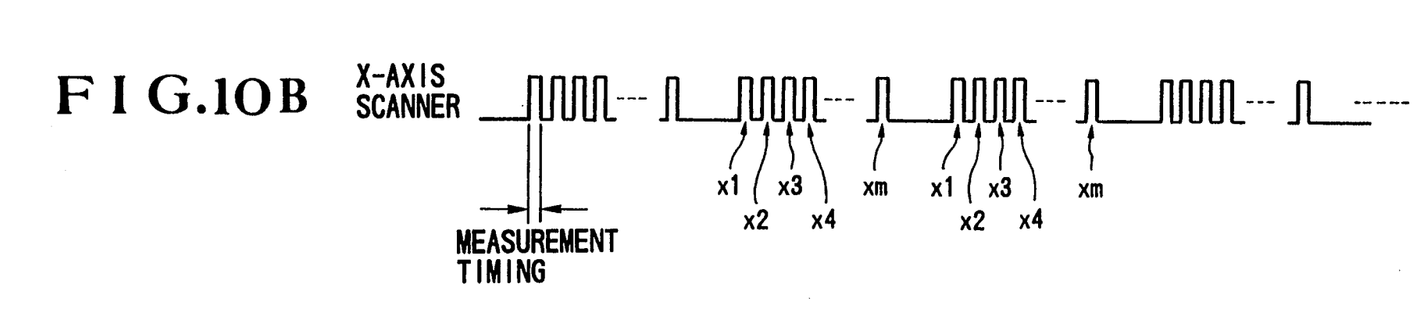

While the Y-axis scanner 102 selects one of the Y-axis loop coils, the X-axis scanner 101 operates to sequentially connect the X-axis loop coils to the input side of the amplification means, as shown in FIG. 10(b). In this case, a timing at which the X-axis scanner 101 selects each of the X-axis loop coils corresponds to one measurement timing.

Figure 11:
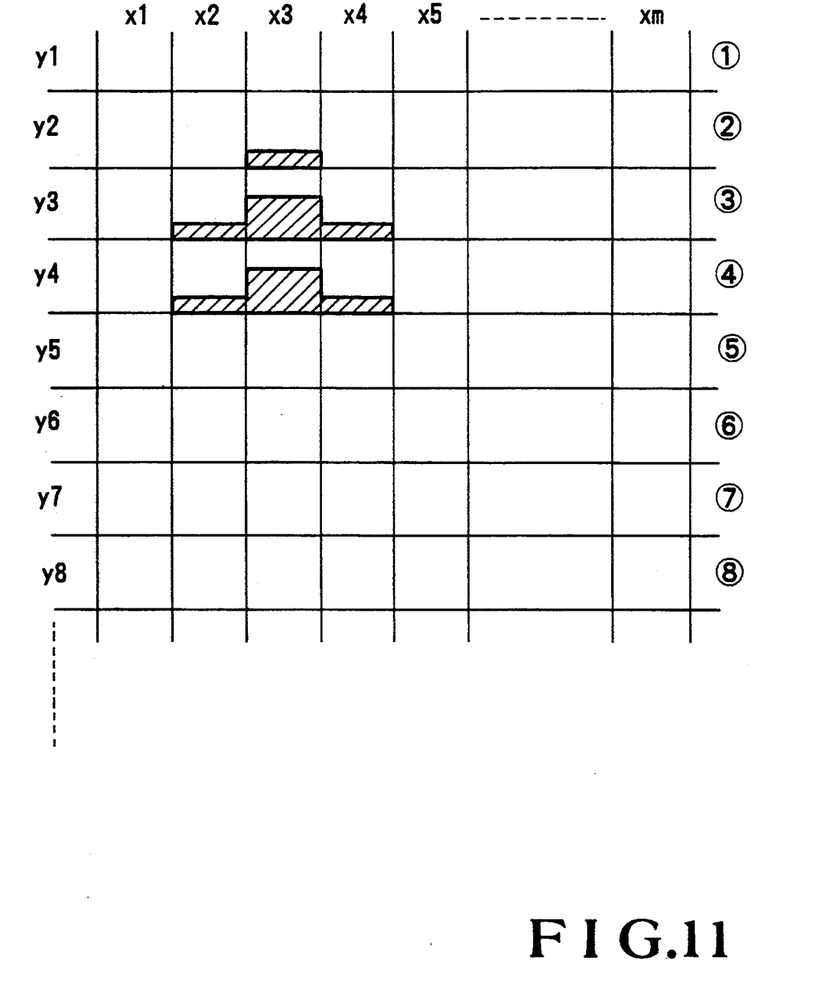
FIG. 11 is a view showing a state in which a position indicated by the position indicator is detected by the apparatus according to the second embodiment.

At each measurement timing, the application circuit 104 receives an output from the amplification means (the amplifier 103) and performs a processing operation such as the one shown in FIG. 11.

FIG. 11 illustrates a scheme, as one of the processing operations of the application circuit 104, which is performed to determine a position indicated by the position indicator 2 on the tablet 1. FIG. 11 corresponds to FIG. 10 showing the measurement timings.

Referring to FIG. 11, reference numeral ①  denotes each output level of the amplification means (the amplifier 103) which is set when the Y-axis scanner 102 selects the loop coil y1, and the X-axis scanner 101 selects each X-axis loop coil; ②, each output level of the amplification means (the amplifier 103) which is set when the Y-axis scanner 102 selects the loop coil y2, and the X-axis scanner 101 selects each X-axis loop coil; and ③, each output level of the amplification means (the amplifier 103) which is set when the Y-axis scanner 102 selects the loop coil y3, and the X-axis scanner 101 selects each X-axis loop coil. In this manner, the application circuit 104 receives the output level of the amplification means (the amplifier 103) as data at each measurement timing, and determines a position indicated by the position indicator 2 on the tablet 1 by performing coordinate calculation.

Each data received by the application circuit 104 has a frequency component dependent on the oscillator arrangement formed in this apparatus, similar to the apparatus of the first embodiment described above. Therefore, if the frequency component of each output data in the application circuit 104 is measured, the resultant data can be used to determine the contact pressure of the position indicator 2 with respect to the tablet 1 or identify the ON/OFF operation of a switch.

Figure 12:
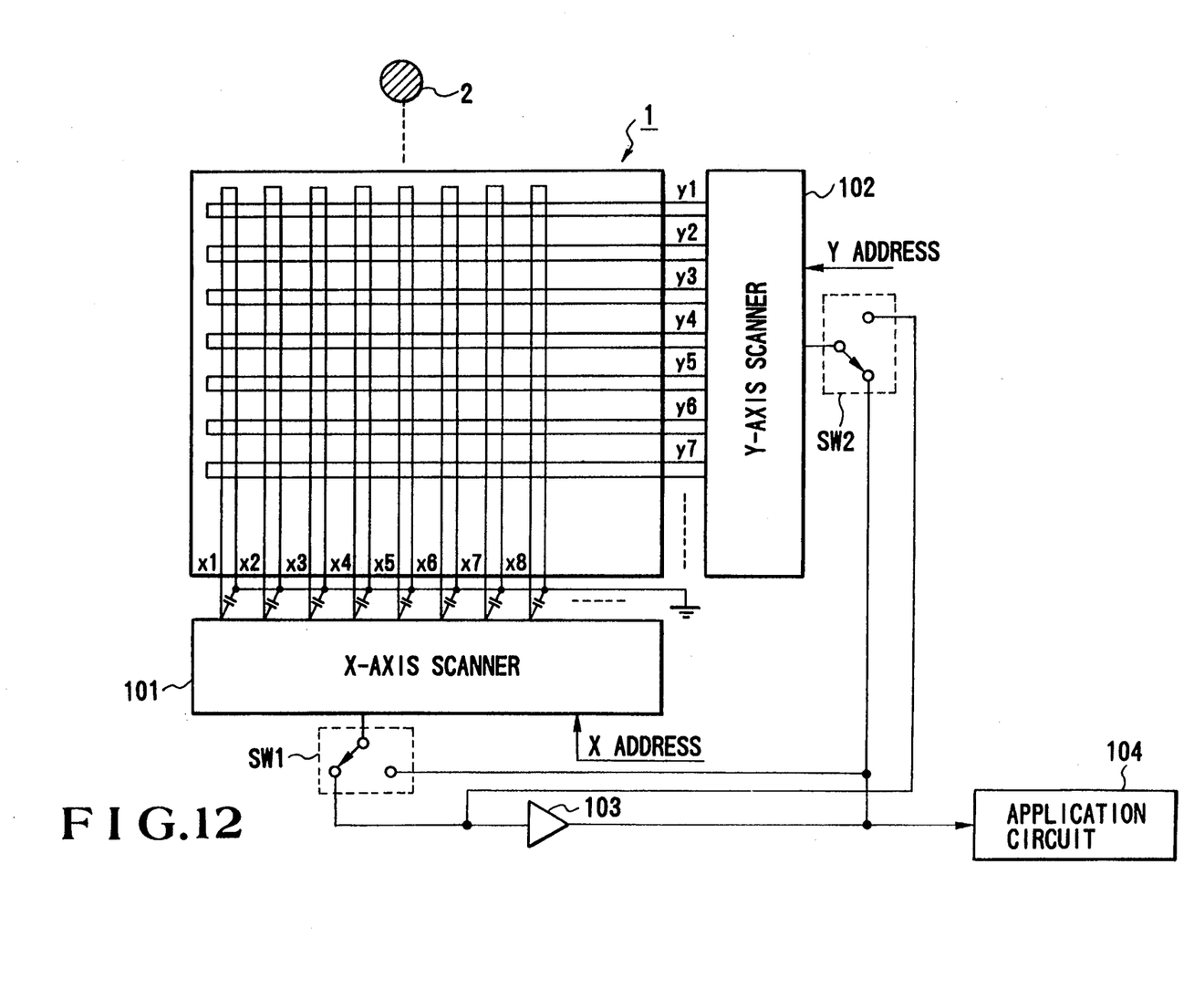
FIG. 12 is a block diagram of the third embodiment of the present invention.

FIG. 12 shows the third embodiment of the present invention. The apparatus of this embodiment and the apparatus of the second embodiment shown in FIG. 7 have the following three different points (1) to (3):

(1) The first different point is that when the coils of the X-axis and Y-axis loop coil groups as the first oscillation element are to be selectively connected to the second oscillation element, the apparatus of the third embodiment selects each coil of the first oscillation element by using a method different from that used by the apparatus of the second embodiment.

More specifically, in the third embodiment, when an X-axis loop coil selected by an X-axis scanner 101 is to be connected to the input of an amplifier 103 as the second oscillation element, all the coils of the Y-axis loop coil group are connected to the output of the amplifier 103. When a Y-axis loop coil selected by a Y-axis scanner 102 is to be connected to the input of the amplifier 103, all the coils of the X-axis loop coil group are connected to the output of the amplifier 103. In this manner, a time division sequence is performed to form oscillator arrangements. In this case, the X-axis and Y-axis scanners 101 and 102 and switches SW1 and SW2 are all controlled by a control circuit (not shown). The following connecting operations are performed under the control of this control circuit.

In the first connecting operation, the X-axis scanner 101 connects a loop coil x1 to the input terminal of the amplifier 103. At this time, the Y-axis scanner 102 connects all the coils of the Y-axis loop coil group to the output terminal of the amplifier 103. An output from the amplifier 103 is then measured by an application circuit 104.

In the second connecting operation, the X-axis scanner 101 connects all the coils of the X-axis loop coil group to the output terminal of the amplifier 103. At this time, the Y-axis scanner 102 does not perform the first connecting operation but connects only a loop coil y1 to the input terminal of the amplifier 103. When the oscillation of the oscillator arrangement formed by this operation is stabilized, measurement is performed by the application circuit 104.

In the third connecting operation, the X-axis scanner 101 connects a loop coil x2 to the input terminal of the amplifier 103. At this time, similar to the first connecting operation, the Y-axis scanner 102 connects all the coils of the Y-axis loop coil group to the output terminal of the amplifier 103. An output from the amplifier 103 is then measured by the application circuit 104.

In the fourth connecting operation, the X-axis scanner 101 connects all the coils of the X-axis loop coil group to the output terminal of the amplifier 103. At this time, the Y-axis scanner 102 connects only a loop coil y2 to the input terminal of the amplifier 103. When the oscillation of the oscillator arrangement formed by this operation is stabilized, measurement is performed by the application circuit 104.

While the X-axis and Y-axis loop coils (the first oscillation element) are alternately sequentially connected to the input and output terminals of the amplifier 103 (the second oscillation element) in this manner, scanning and measurement are performed. A position determining method and the like in the application circuit 104 are the same as those in the second embodiment described above.

(2) The second different point of the apparatuses of the second and third embodiments is that a position indicator 2 as the third oscillation element of the third embodiment is constituted by a conductive disk (conductive block) or a magnetic member in the third embodiment.

Even if the third oscillation element is constituted by a conductive disk or a magnetic member instead of a conductor such as a coil, an oscillator arrangement can be formed.

(3) The third different point of the apparatuses of the second and third embodiments is that capacitors are connected to the X-axis loop coil group as one coil group of the first oscillation element to form the loop coils of the first oscillation element into resonant circuits in the third embodiment.

With this arrangement, the first oscillation element can be excited even by relatively small noise, and hence oscillation can be easily caused at a resonance frequency determined by the overall oscillator arrangement.

In each embodiment described above, an amplifier is used as the second oscillation element. However, the second oscillation element is not limited to an amplifier, and any circuit element can be used as the second oscillation element long as it can maintain oscillation. For example, a circuit element having a so-called negative resistance which exhibits negative voltage/current characteristics can be used.

All the apparatuses of the respective embodiments described above belong to the electromagnetic coupling type. However, the present invention can be applied to a so-called static coupling type digitizer. In this case, as the first oscillation element, the above-described loop coils can be used, or a conductor may be used. The second and third oscillation means may have the same arrangements as those in each embodiment described above.

In the apparatus of each embodiment, ambient noise is exemplified as an oscillation trigger for the oscillator arrangement when the position indicator 2 is placed on the tablet 1. However, in addition to this noise, a shock which is caused when switching of the X-axis and Y-axis scanners is performed may be used as an oscillation trigger.

As has been described above, according to the present invention, when the position indicator is placed at an arbitrary position on the tablet, the first, second, and third oscillation elements constitute an oscillator arrangement, and magnetic fields or electric fields which are generated by the position indicator when the oscillator arrangement oscillates act on the coordinate determining conductor groups, thereby determining the coordinates indicated by the position indicator. Therefore, the digitizer requires no special oscillator.

In addition, when the oscillator arrangement oscillates, the coordinates indicated by the position indicator are determined on the basis of an output from the second oscillation element. Therefore, the digitizer requires no special oscillator, and an output signal representing the position indicated by a position indicator has a high level, thus allowing accurate detection of the coordinates.

Furthermore, since the ON/OFF operation of a switch of the position indicator is identified on the basis of the oscillation frequency of the oscillator arrangement constituted by the third oscillation element whose load is variably changed by a single or plurality of switches, and the first and second oscillation elements, both the position indicated by the position indicator and switch operation information can be easily and quickly detected. In addition, the oscillation frequency of the above-described oscillation system is variable and can be set to be an arbitrary value within the usage range. Therefore, even if a large number of switches are arranged in the position indicator, these switches can be easily identified.

Moreover, since a capacitor whose capacitance is variably changed in accordance with the writing pressure is connected to the coil, as the third oscillation element, of the position indicator, the oscillation frequency of the oscillator arrangement can be continuously changed in accordance with the writing pressure acting on the position indicator. By detecting this change in frequency, writing pressure information of the pen-like position indicator can be continuously obtained.

What is claimed is:

1. A digitizer constituted by a tablet and a position indicator to determine coordinates indicated by said position indicator on said tablet, comprising:
   a set of coordinate determining conductor groups arranged on said tablet;
   a first set of oscillation elements, having at least a first element and a second element, arranged on said tablet;
   at least a second oscillation element coupled to said first set of oscillation elements, said second oscillation element having an input and an output wherein said input of said second oscillation element is connected to said first element of the first set of oscillation elements and said output of said second oscillation element is connected to said second element of the first set of oscillation elements; and
   a third oscillation element arranged on said position indicator,
   wherein when said position indicator is placed at an arbitrary position on said tablet, said first set of oscillation elements, said second oscillation element, and said third oscillation element constitute an oscillator system to generate a coordinate signal such that the coordinates indicated by said position indicator are determined based on a plurality of signals generated in the coordinate determining conductor groups by causing magnetic fields and electric fields, generated by said position indicator when said oscillator system oscillates, to act on said coordinate determining conductors groups.

2. A digitizer constituted by a tablet and a position indicator and designed to determine coordinates indicated by said position indicator on said tablet, comprising:
   a plurality of first oscillation elements arranged at predetermined positions on said tablet;
   a second oscillation element with an input and an output;
   a selection means, which has respective connections that sequentially selects a set of first oscillation elements from said plurality of first oscillation elements, wherein a first selected oscillation element of said selected set of first oscillation elements is coupled to the input of the second oscillation element, and a second selected oscillation element of said selected set of first oscillation elements is coupled to the output of the second oscillation element; and
   a third oscillation element arranged on said position indicator,
   wherein when said position indicator is placed at an arbitrary position on said tablet, said selected set of first oscillation elements, said second oscillation element, and third oscillation element constitute an oscillator system, and
   the coordinates indicated by said position indicator are determined on the basis of outputs from the oscillation of said oscillator systems formed of a set of different first oscillation elements sequentially selected by said selection means.

3. A digitizer according to claim 1, wherein said third oscillation element of said position indicator is variably changed by a switch of said position indicator, and
   oscillation frequencies of said oscillator system are variably changed by said switch of said position indicator, so that an ON/OFF operation of said switch of said position indicator is identified on the basis of the oscillation frequency of said oscillator system.

4. A digitizer according to claim 1, wherein said third oscillation element of said position indicator is variably changed by a writing pressure of an operator, and
   oscillation frequencies of said oscillator system are variably changed by said writing pressure, so that a writing pressure information of said position indicator is detected on the basis of the oscillation frequency of said oscillator system.

5. A digitizer according to claim 1, wherein said first oscillation elements comprise a set of two-phase grid structures having a X direction and a Y direction, wherein a first structure of said set of two-phase grid structures is arranged in the X direction, and a second structure of said set of two-phase grid structures is arranged in the Y direction.

6. A digitizer according to claim 5, wherein one of said two-phase grid structures is connected through a polarity inverter at the input of said second oscillation element.

7. A digitizer according to claim 1, wherein said second oscillation element comprises a signal amplifier.

8. A digitizer according to claim 7, wherein said signal amplifier comprises:
   a first amplification means to amplify an input signal proportionally, said first amplification means having an input and an output; and
   a second amplification means to amplify said output of said first amplification means to a saturation level.

9. A digitizer according to claim 2, wherein said plurality of first oscillation elements comprise an X-axis loop coil group sequentially arranged in a X direction, and an Y-axis loop coil group sequentially arranged in a Y direction,
   said selection means comprises an X-axis scanner to select a x-axis first oscillation element from said X-axis loop coil group and a Y-axis scanner to select a Y-axis first oscillation element from said Y-axis loop coil group, and
   said X-axis first oscillation element is connected to the input of said second oscillation element, and said Y-axis first oscillation element is connected to the output of said second oscillation element.

10. A digitizer according to claim 2, wherein
    said plurality of first oscillation elements comprise an x-axis loop coil group sequentially arranged in a X direction, and a Y-axis loop coil group sequentially arranged in a Y direction;
    said selection means comprises
    an X-axis scanner, which is selectively switched to a X-axis first scanner mode connected to the input of said second oscillation element by selecting one first oscillation element from said X-axis loop coil group, and to a X-axis second scanner mode connected to the output of said second oscillation element by selecting all the coils of said X-axis loop coil group, and a Y-axis scanner, which is selectively switched to one of a Y-axis first scanner mode connected to the input of said second oscillation element by selecting one first oscillation element from said Y-axis loop coil group, and a Y-axis second scanner mode connected to the output of said second oscillation element by selecting all the coils of said Y-axis loop coil group; and when said X-axis scanner is in said X-axis first scanner mode, said Y-axis scanner is set to the Y-axis second scanner mode, and when said X-axis scanner is in the X-axis second scanner mode, said Y-axis scanner is set to the Y-axis first scanner mode.

11. A digitizer according to claim 2, wherein said second oscillation element comprises a signal amplifier.

12. A digitizer according to claim 11, wherein said signal amplifier comprises:

a first amplification means to amplify an input signal proportionally, said first amplification means having an input and an output; and a second amplification means to amplify the output of said first amplification means to the saturation level.

13. A digitizer according to claim 2, wherein said third oscillation element of said position indicator is variably changed by a switch of said position indicator, and oscillation frequencies of said oscillator system are variably changed by said switch of said position indicator, so that an ON/OFF operation of said switch of said position indicator is identified on the basis of the oscillation frequency of said oscillator system.

14. A digitizer according to claim 1, wherein said third oscillation element of said position indicator is variably changed by a writing pressure of an operator, and oscillation frequencies of said oscillator system are variably changed by said writing pressure, so that a writing pressure information of said position indicator is detected on the basis of the oscillation frequency of said oscillator system.

* * * * *